US006643286B1

(12) United States Patent
Kapadia et al.

(10) Patent No.: US 6,643,286 B1
(45) Date of Patent: Nov. 4, 2003

(54) MODULAR SWITCHES INTERCONNECTED ACROSS A COMMUNICATION NETWORK TO ACHIEVE MINIMAL ADDRESS MAPPING OR TRANSLATION BETWEEN TERMINATION DEVICES

(75) Inventors: Viren H. Kapadia, Austin, TX (US); Rupaka Mahalingaiah, Austin, TX (US)

(73) Assignee: Dunti Corporation, Austin, TX (US)

(*) Notice: Subject to any disclaimer, the term of this patent is extended or adjusted under 35 U.S.C. 154(b) by 0 days.

(21) Appl. No.: 09/312,241

(22) Filed: May 14, 1999

(51) Int. Cl.$^7$ .......................... H04L 12/28; H04L 12/56
(52) U.S. Cl. ........................... 370/389; 370/400
(58) Field of Search .................. 370/428, 429, 370/351–356, 357–360, 400, 401, 403, 229–236.1, 248, 250, 404–406, 408, 412, 389, 396, 397

(56) References Cited

U.S. PATENT DOCUMENTS

| 4,538,026 A | | 8/1985 | Yasue |
| 5,095,480 A | | 3/1992 | Fenner |
| 5,425,026 A | * | 6/1995 | Mori ........................... 370/410 |

(List continued on next page.)

FOREIGN PATENT DOCUMENTS

| EP | 0 403 973 | 12/1990 |
| EP | 0 751 642 | 1/1997 |
| EP | 0 855 820 | 7/1998 |

OTHER PUBLICATIONS

Xedia Corp., "Demystifying Bandwidth Management," www.xedia.com/products/demystify.htm, last modified: Feb. 22, 1999.

Xedia Corp., "CBQ Frequently–Asked Questions," www.xedia.com/products/cbq_faq.htm, last modified: Mar. 11, 1999.

(List continued on next page.)

*Primary Examiner*—Wellington Chin
*Assistant Examiner*—Raj Jain
(74) *Attorney, Agent, or Firm*—Kevin L. Daffer; Conley Rose P.C.

(57) ABSTRACT

An architecture, system and method are provided for efficiently transferring packets of data across a communication network. The communication network is structured such that there are hierarchical levels of high speed switches existing throughout the network. Distributed routing of packets is achieved by comparing identification numbers of only select switches with the destination address on a field-by-field basis. Not all fields need be compared at all switches. Once routing is achieved within the structured network, transfer to a destination termination device occurs through a single look-up table only when departing the network if multiple termination devices are present at that exit node. The routing operation between termination devices can therefore be achieved using a single mapping operation (if more than one termination device must be selected) and is backward compatible with devices external to the network and protocols used by those devices. An additional protocol layer specific to the structure is wrapped onto the incoming packet protocol using a series of read cycles to a memory which temporarily receives the incoming protocol. The sequence of reads can be quickly achieved without using conventional packet processors and the delayed access times normally attributed to those processors. Each switch thereby serves as a traffic manager, having registers that are configured so as to allow the traffic manager to direct packets of data from an input port to an output port in the quickest, most efficient manner without having to decode the entire destination address or requiring time-consumptive routing tables.

16 Claims, 8 Drawing Sheets

U.S. PATENT DOCUMENTS

| | | | |
|---|---|---|---|
| 5,485,455 | A | 1/1996 | Dobbins et al. |
| 5,596,715 | A | 1/1997 | Klein et al. |
| 5,721,819 | A | 2/1998 | Galles et al. |
| 5,822,309 | A * | 10/1998 | Ayanoglu et al. ............ 370/315 |
| 5,864,683 | A | 1/1999 | Boebert et al. |
| 6,119,171 | A | 9/2000 | Alkhatib |
| 6,260,120 | B1 * | 7/2001 | Blumenau et al. ........... 711/152 |
| 6,275,494 | B1 * | 8/2001 | Endo et al. ............. 370/395.52 |
| 6,292,492 | B1 * | 9/2001 | Bonomi et al. .............. 370/415 |
| 6,304,552 | B1 * | 10/2001 | Chapman et al. ............ 370/232 |
| 6,356,551 | B1 * | 3/2002 | Egbert ......................... 370/389 |

OTHER PUBLICATIONS

Xedia Corp., "Delivering Internet Access Quality of Service," www.xedia.com/products/delivering_access.htm, last modified: Mar. 15, 1999.

Antonio et al., "A Fast Distributed Shortest Path Algorithm for a Class of Hierarchically Structured Data Networks," © 1989 IEEE, pp. 183–192.

* cited by examiner

MODULAR SWITCHES INTERCONNECTED ACROSS A COMMUNICATION NETWORK TO ACHIEVE MINIMAL ADDRESS MAPPING OR TRANSLATION BETWEEN TERMINATION DEVICES

BACKGROUND OF THE INVENTION

1. Field of the Invention

This invention relates to an interconnected, distributed communication system ("network") and more particularly to a structured network of modular switches that is backward compatible with existing broadcast resolution protocols ("ARPs") used to find an internet protocol ("IP") identification address of a targeted termination device and its relation to one or more end switch identification addresses within the structured network. Knowing an end switch address, a data packet targeted for that switch (and ultimately to the termination device) need only perform a single mapping or translation operation when transferring a packet to one of several termination devices which might be linked to the structured network.

2. Description of the Related Art

A communication network is generally regarded as an interconnected set of subnetworks or subnets. The network can extend over localized subnets as an intranet, or can extend globally as an internet between one or more intranets. A communication network can therefore forward data within a localized network between termination devices extending to almost anywhere around the world. The termination devices include any data entry/retrieval system (e.g., telephone or computer), and a network includes a local and/or global interconnection of termination devices configured on one or more subnets.

The basic underpinnings of network operation is the various protocols used to communicate between termination devices. A popular foundation for those protocols is the Open System Interconnect ("OSI") model. Using that model or a derivative thereof, protocols can be developed which work in concert with each other. A popular communication protocol includes the Transmission Control Protocol ("TCP") and the Internet Protocol ("IP"). Protocols such as TCP/IP determine how the termination devices will communicate with each other over a network configured with or without internet connection.

Many popular protocols including TCP/IP deliver data across the network in the form of a packet. Each packet of a particular message may be sent across different routes of the network at the same time and then reassembled at the proper termination device. In order to ensure the packets are properly received, certain layers of the OSI protocol stack will wrap the data before the packet is sent across the network. For example, TCP can divide data into segments which are then placed into, for example, IP datagrams having a header which includes the IP address of the originating and receiving termination devices. The IP datagram and header is, therefore, a wrapped IP which gets further wrapped when transferring the IP wrapper from the network layer to the data link and physical layers. For example, the IP datagram can be further wrapped using a Point-to-Point Protocol ("PPP"), a popular such protocol being that which follows the Ethernet specification at the physical layer. Thus, it is not until the IP has been wrapped possibly several times will be TCP be forwarded across the network.

Coupled between subnets of a network are various classes of devices, including bridges, routers, and switches. Bridges and switches for the most part operate primarily in hardware and within the domain of the data link layer. Legacy routers, on the other hand, operate within the network layer and can be programmed and reconfigured to intelligently forward packets across the network according to the most optimal routing path. Although the distinction has become somewhat blurred with modern day network layer switches and bridges, it is still the primary intent that a switch and bridge be employed mostly in hardware. Based on configuration of the switch or bridge, all data packets received by a particular input port are routinely sent to any particular output port or ports. This operation can be quickly repeated each time a packet is received.

While switches are relatively fast and can send data from an input port to an output port with very little delay or lag time, switches do not have the capability to adapt to change in traffic conditions as do routers. Because routers can easily adapt to avoid traffic bottlenecks, routers employ look-up tables and fairly complex routing algorithms. Typical routers are based on a packet processor. The processor can be programmed to determine the most optimal connection between input and output ports of the router. Coupled to the processor is a memory bus and associated system memory, whereby routing tables can be stored in the system memory and are periodically fetched by the processor whenever a routing decision is to be made. Thus, when a packet is received on one port of the router, the processor will execute a look-up operation by fetching the appropriate table information from system memory. Most routing tables are dynamic, in that they constantly change as network traffic and conditions change, so that the processor can interconnect the ports in a way that is most efficient at that time. Dynamic routing tables can be built and re-built using various routing protocols, popular such protocols include Routing Information Protocol ("RIP") and Exterior Gateway Protocol ("EGP").

Periodically programming the routing tables may mean that one router on a network will not know the location of the physically closest router or its placement within the network. The router will simply route based on its existing routing table and the resulting look-up outcome. Such a system can be considered a non-relative or non-deterministic router topography. Non-deterministic routers tend to rely on the number of hops (i.e., the number of routers or gateways) when determining the most optimal routing path. Thus, while a router may know the number of additional routers on a given path, it does not necessarily know or have a link to the identity of those routers.

In most modern networks, a packet will travel more than 10 or 20 hops before arriving at its destination. As defined herein, a hop is equivalent to a traversal of a router or address translator. More specifically, a hop is defined as an operation that invokes a look-up or translation operation. When traveling across a network, a packet may be sent across numerous look-up or translation tables, and also through numerous switches, before arriving at its destination. It is generally recognized that transmission latency is lessened, and transmission bandwidth increased, if the number of hops is reduced. Therefore, it is desirable that the number of hops from one termination device to another termination device be minimal. This is due, in part, to the time-consumptive look-up (or address translation/ modification) procedure performed by each router. Furthermore, since a particular router will not necessarily know the placement of all other routers of a network, each look-up table must include identification numbers or addresses for each of the other routers within the network— even those not within the optimal routing path. The destination address is compared against each of those identification numbers for each routing operation. If a network is quite large, the access times needed to perform a look-up from the packet processor to the system memory can be correspondingly long.

This problem is compounded with the advent of high speed networks of one gigabits per second (Gb/s) or higher. Look-up techniques needed to render forwarding decisions on rather large look-up tables drastically reduces the benefits of using high speed networks. Many termination devices use high speed physical media, such as Ethernet. Moreover, subnet loops which interconnect localized devices can use even higher speed signals such as, for example, Synchronous Optical Networks ("SONETs").

If the IP packets enter the input port of a router more quickly than that router can process those packets, the packets are sent to an input queue. The router processes packets from the queue in the order in which they are received. If the number of packets received exceeds the capacity of the queue, packets may be lost and may need to be resent. If the comparison between the IP destination and the routing table takes a significant amount of time, then it may be likely that numerous packets may be lost. Frequency of lost data would increase when bursts of data are being sent. The time needed to re-send packets deleteriously hinders the overall throughput of the network.

It would be of benefit to introduce an improved switch having switching speeds of a conventional switch yet also having the adaptability of a router. The improved switch would avoid the throughput constraints of a conventional packet processor and system memory interface and, more importantly, the detriments of an extensive look-up table. The desired switch would be even more beneficial if it could maintain backward compatibility with the OSI model, protocols of that model, and address resolution used by various Address Resolution Protocols ("ARP"). Still further, the improved switch should desirably be used in an overall network that is deterministic as to the relative placement of each switch within that network. Thus, the switch could determine if it should wrap (or strip) incoming packets as an end switch or should pass-through packets as an intermediate or pass-through switch, both switches advantageously performing those functions with minimal time delay.

SUMMARY OF THE INVENTION

The problems outlined above are in large part solved by a structured network, an enabling distributed routing mechanism, an addressing mechanism used within that network, and forwarding/directing devices ("modules") topologically related to one another based on their position within the network. The modules, due to an awareness of their position or location with respect to the structured network, allow adaptive fast forwarding of packets across the network. The modules represent an improvement over conventional switches and/or routers. Instead of statically routing packets in the same manner each time, as in conventional switches, the modules include some features of conventional routers, yet without the detriments of routers. The modules can forward and/or direct packets of data relatively fast (similar to conventional switches), and can dynamically change the forwarding path based on activity within the network. For sake of brevity in its description, the modules perform a hybrid of a switch/route function and are henceforth referred to as switches based on the speed at which they forward packets of data, and that they perform a selection function applicable to switches in general. However, it is recognized that the present switches are altogether dissimilar from conventional switches, and are also dissimilar from conventional routers.

The network can be made up of numerous switches extending between termination devices. Each switch performs fast deterministic switching of packets across the network based on conditions of the network. The network can be placed within only a portion of a conventional network, a subnet of which is coupled to one or more termination devices. Regardless of where it is configured, the present network includes one or more topological levels of switches that are structurally related to one another. Each switch within the network is assigned a unique identification number possibly corresponding to the hierarchical level of the network topography that can be ascertained within a given field attributed to that level. For example, the most significant field of bits may be allocated to the highest hierarchical level of switches, followed by the next most significant field allocated to the next highest level of switches. With each level of hierarchy, structure is provided. Structure is also provided within each level. The switches are organized according to some predetermined structure within a given hierarchical level which is reflected in the field of the identification number corresponding to that level. Distributed routing can therefore be achieved by comparing a destination address of the wrapped data packet with identification numbers of those hierarchical levels depending on the location of the switch receiving the incoming packet. Switches direct/forward data packets by determining the direction of flow of the incoming packet based on comparing (or decoding) the destination address of the packet with the relative position of the switch indicated by the switch's identification number. As the result of this direction/forwarding operation, traditional routing methods are eliminated. Also, decoding operations eliminate routing in what was determined, at a higher hierarchical level, to be an unused path. Decoding within lower levels can be restricted only to those switches that the higher levels point toward. Moreover, decoding can be accomplished in a fairly rapid manner and need not occur if a comparison at the higher level will direct the packet to another branch of lower level switches. In this manner, each switch is assigned an identification number based on its relative position within the network. Accordingly, the structured network can be thought of as having a relative or deterministic routing topography absent the detriments of conventional routers. Hence the deterministic routing acts as a distributed router. Instead of performing routing functions at every node in the network, the distributed router performs incremental routing functions at every node and the data forwarding function is achieved across the entire network.

Within the structured network is at least one switch and, preferably, numerous switches interconnected to form an intranet, an internet, or a combination of both. The switches can be classified as an end switch, a pass-through switch, or an intermediate switch. The end switches are those that are configured adjacent termination devices and are used to perform protocol wrapping functions as packets of data enter the structured network, or strip protocol used by the structured network when packets exit the network. The end switches also perform a routing function similar to intermediate switches or pass-through switches. The end switches, intermediate switches, and pass-through switches can be configured in hardware to be substantially the same, with only the programmed function being different based on where within the network the switches are placed. Each switch includes a minimum of one bi-directional port and a traffic manager which controls the port, or ports. The number of ports is scalable in that there may be one or more input ports and one or more output ports arranged in various configurations with the traffic manager deciding which packet received on an input port will be forwarded to which of the various output ports. The traffic manager includes a decoder and various buffers. The decoder performs a comparison between the destination address and the identification number of that switch based on the position of that switch within the overall structured network. The comparison and decision are based on the comparison represented as an incremental step in the distributed routing function (data forwarding function) of the network.

A shared or distributed buffer may be placed within the data flow path to receive a packet and to forward that packet to the appropriate output port based on the destination address. Instead of forwarding the data into a buffer, the data can be selectively forwarded across one or more bypass conductors coupled in parallel across the buffer. Thus, a module which forms an intermediate switch or end switch can be configured with bypass operations applicable to a pass-through switch or a pass-through node, and the bypass paths are used to reduce latency in the switches. The buffer can also be contained with an end switch and configured with control information. Through a series of read or fetch operations, the buffer may be used to wrap an incoming packet and associated address with control information as well as an originating address of the end switch. The fetch operations occur in rapid succession from a traffic controller of the traffic manager.

The structured network is one that is completely compatible with protocols currently used in, for example, the OSI model. Specifically, a conventional address resolution protocol can be used to determine the location of a destination termination device by comparing an address (e.g., IP address) broadcast over the structured network. Once the destination termination device is found, the end switch within the structured network that is linked to the termination device can also be found. The end switch nearest the destination termination device can be thought of as an exit end switch whose identification number is known. When packets of information are to be sent to the destination termination device, it is known that those packets will be targeted to the exit end switch and forwarding operations are achieved through the hierarchical decode operation using a series of compare operations within only select switches of certain hierarchical levels. The entry end switch adjacent the entry termination device will wrap the physical media packet with an originating identification number of the entry end switch. The packet can then be forwarded throughout the structured network without having to perform any look-up operations.

When the packet arrives upon the exit end switch, control information of the structured network is stripped from the packet and a relatively small mapping table may be used to forward the packet to a relatively small number of destination termination devices selectively linked to the exit end switch. If, however, only one termination device is linked to the exit end switch, then mapping is not needed and consequently, no translation need occur. The comparison or translation performed at the exit end switch occurs to bridge the gap between the structured network and any external protocol or domain, hence the translation is a full comparison. For example, a full 32-bit random IP address can be used to look-up a 48-bit Ethernet address of the termination device. Across the structured network, instead of having to make a comparison of an incoming address against all switch identification numbers, the deterministic network hereof need only compare a field of bits within a certain level of the network depending on where the entry end switch is located within the hierarchical level. Further comparisons are performed only on a field-by-field basis, each time lessening the number of fields needing comparison. In instances where the structured network is quite small, comparison may be required only on a single field to determine, for example, whether to forward the packet left or right around a single loop.

Only a fraction of the overall number of switch identification numbers are compared against the destination address and, more importantly, no look-ups are needed in the forwarding operations. In particular, a self-compare operation occurs within each switch's decoder along the forwarding path. A result of the self-compare is a switch within one level pointing to another switch in another level based solely on the decode operation. Only a small mapping operation may be needed by the exit switch when identifying which of the various destination termination devices connected to the exit end switch will receive data. The number of termination devices connected to the exit switch is significantly smaller than the sum total of switches or nodes within a network. Importantly, the extent of the translation table associated with the exit end switch is local to that switch's location within the network node and to the domain of the termination devices known to be connected to it. The mapping table is completely independent of the interior structured network and is based solely on a known relationship between an exit end switch and termination devices connected thereto. This allows the mapping table to be static for the most part. Any changes to this table is completely localized and does not require updating of other nodes and/or switches within the structured network.

The addressing mechanism thereby targets the exit end switch after performing a conventional address resolution protocol. When forwarding data back from the exit end switch via the termination device connected thereto, the forwarded data can be directed to the entry end switch via the entry end switch identification number placed on the packet received by the destination termination device. Accordingly, in a reply to the originating packet, no look-ups are needed. Only a relatively small mapping operation may be needed when forwarding the reply outside of the structured network (i.e., when forwarding the reply packet back to the originating termination device). Thus, if more than one termination device is linked to the end switches, only one mapping occurs when routing packets of data from the structured network, either to the destination termination device or back to the origination termination device. All routing functions are achieved by a field-by-field comparison, much like a distributed routing operation.

The entry and exit end node identification numbers may be configured or reconfigured such that they are recognizable to the termination devices connected thereto. For example, if the network is to receive Ethernet-based packets, then the entry and exit end switches are configured with identification numbers that are within the Ethernet address range. Since the network is structured, with successive nodes and/or switches being recognizable to each other, all other switches in the network are in the same addressing domain. This allows for replacement of the termination device address with the identification number of the entry/exit end switch proximate to that device. Importantly, the termination device which forwards the destination address can now recognize that the address (e.g., Ethernet address)

of the termination device at the opposing end of the network is at the Ethernet address of the end switch connected to that device.

At the entry end switch, the incoming termination device address (e.g., Ethernet address) can be replaced with the Ethernet address of the entry end switch (i.e., the entry end switch identification number) in the data packet. The targeted or destination termination device recognizes that the data originating from the incoming termination device is that of the entry end switch and now knows to forward all replies to the identification number, or address, of that switch. When the reply reaches the originating entry end switch (i.e., exit end switch for the reply), the next highest level of protocol (e.g., IP address) address is used to identify 1 of possibly N termination devices attached to the entry end switch. This is a fairly simply reply translation, and the only look-up needed during the reply operation. The relatively simple look-up, like the request look-up preferably involves a small, static look-up table local only to the end switches. The only entries within the table are the next protocol level (e.g., IP within the protocol stack) relative to the physical protocol level (e.g., Ethernet) address mapping.

A traditional hop used by conventional routers may involve replacement of a lower level (e.g., Ethernet) source and destination address of the packet with the next destination Ethernet address. The next destination Ethernet address (or hop address) is determined by the routing table within the convention router, said table is dynamically managed by the network. The present switches replace the source address at the entry and destination address at the exit end switch, but not for purposes of "hop" routing. Instead, the present switches merely allows for more than one termination device per entry-exit switch. If only one termination device is coupled to an end switch, then address translation, look-up or hop is not needed. Simply a 1-to-N or N-to-1 mapping occurs. In a conventional sense, a hop is not used. Instead, the exit end switch simply performs a mapping of 1-to-N when exiting the structured network, provided of course that N termination devices are present. If only one termination device is present, or if routing functions are present in multiple termination devices, then the end switches need not perform any mapping whatsoever.

The traffic manager within a particular switch can be combined with other traffic managers of other switches to form a modular switch arrangement having any of numerous input and output port configurations. Additionally, each input port of the modular-connected traffic managers can receive data at differing speeds and with differing formats or protocols. The modular connection of traffic managers can form an overall switch that is compatible with dissimilar protocols and transmission speeds for use in any desired network connection or multiple network connections. For example, the input port attributed with a first traffic manager can receive 1.0 gigabit Ethernet information, whereas another input port attributed with another traffic manager can receive 5.0 gigabit fiber optic information. Thus, each traffic manager includes buffers which not only receive and temporarily store packets, but also are used to interface with differing transmission speeds of packets forwarded to the input port and packets exiting from the output port.

Within a modularized, interconnected set of traffic managers and associated ports, is a local bus which couples a control processor to each of the scaled traffic managers. A single control processor can therefore be used to receive diagnostic, monitoring, and control information necessary to perform those functions upon one or more of the inter-linked traffic managers. The diagnostic, monitoring, and control information can be sent across an optical fiber, a copper conductor, or a wireless medium to the control processor which will then forward the appropriate control signals across the local bus. The diagnostic, monitoring and control ("DCM") signals may be transmitted to the control processors and traffic managers using the same network, resulting in an in-band signally or more optimally, the processors and traffic managers can use the DMC signal for out-of-band signaling.

For example, the traffic managers can be programmed or configured when they are installed within the network and reconfigured from a centralized location at a later date via a transceiver and the control processor. Reconfiguration performed in conjunction with self-testing operations can determine historical traffic congestion areas of the network to allow the network to adapt and reroute packets away from the congested areas. Rerouting can occur either by configuring the traffic managers in those suspected areas or broadcasting a reconfiguration signal from the centralized locations. Importantly, however, the DMC signals sent to the control processor, and the control processor and local bus interface can remain entirely outside the data flow path. Data flow does not depend on, and therefore is not slowed by, access to and from the control processor. Once the control processor has performed its function, further access thereto is not needed.

According to one embodiment, a communication network is provided. The communication network is a structured network with distributed routing function comprising a plurality of interconnected switches. To enable distributed routing, each switch includes an identification number bifurcated into several groupings of bits, or fields. A first grouping of bits helps identify a first switch for receiving data of the network prior to a second grouping of bits identifying a second switch for receiving data from the first switch. The first switch can be considered as being within a first hierarchical level and the second switch can be considered within a second hierarchical level. The first and second hierarchical levels are not necessarily the highest level and second to highest level, but are simply two levels within the overall hierarchy. A decoder within the first switch can compare an address of the forwarded data or packet with the first grouping of bits if the address originates from a switch within a hierarchical level dissimilar from the first hierarchical level. Thus, the originating address is either in a hierarchical level above or below the first hierarchical level. The same can be said regarding a decoder within the second switch and its comparison function.

The first switch, or first set of switches within the first level, are connected upon or between a first set of loops that are associated with a first set of network nodes. Likewise, the second switch, or second set of switches within the second level, are connected upon or between a second set of loops that are associated with a second set of network nodes. According to one example, at least one network branch may be terminated at both ends by a switch within the first set of switches and a switch within the second set of switches to enable coupling of the first set of network nodes to the second set of network nodes to provide a selectable routing path. The network nodes and network branches can be thought of as extending at least partially between terminating devices to form a data flow path therebetween.

According to another embodiment, the structured network can be modularized. The modular network includes a set of switches interconnected across at least a portion of the network. A single control processor is also provided having a local bus extending between the control processor and each of the set of switches. The local bus is adapted to receive from the control processor diagnostic, monitoring or control signals. The control signals may include signals used to, e.g., reconfigure an identification number for at least one of the set of switches to change routing of data or packets through those set of switches. The control processor can receive wireless or wired (optical or solid conductor) communication from a transceiver placed remote from the control processor.

According to still another embodiment, the structured network may include more than three nodes and three branches. Only one switch within one node may be used to perform a single 1-to-N address mapping as the data traverses the entire routing network and is forwarded to the selected one of N termination devices with no routing look-ups in the interim. The mapping can be performed by a selection device, such as for example a multiplexer or router, and the mapping is used to select only between multiple termination devices, and not between ensuing nodes and/or switches within the network.

An addressing mechanism is contemplated for use within the network. The network thereby includes an entry end switch and an exit end switch. Both entry and exit end switches are selectably may be coupled to a plurality of termination devices, one of which is an exit termination device or destination termination device to which one or more packets are currently being sent. Between the exit and entry end switches are a plurality of intermediate switches. The packet is compiled by the entry end switch to contain a destination address of the exit end switch. The packet is forwarded through the plurality of intermediate switches, with each intermediate switch having an identification number which points the packet to a successive one of the plurality of intermediate switches and finally to the exit end switch. The exit end switch performs the single mapping translation in order to forward the packet solely from the exit end switch to the exit termination device. Thus, while addressing within the structured network may be unique to that network, addressing outside of that network remains compatible with existing OSI layer protocols applicable to TCP/IP, SONET, and/or Ethernet, for example.

Yet further, a method is contemplated for routing data. The method includes compiling a packet comprising a destination address of the exit end switch and a source address of the entry termination device, and thereafter forwarding the packet from the entry termination device to the entry end switch. While maintaining the destination address, updating the source address to the address of the entry end switch while forwarding the packet from the entry end switch to the exit end switch, exclusive of look-up operations in the interim. While maintaining the source address, updating the destination address to the address of the exit termination device while routing the packet from the exit end switch to the exit termination device.

Before compiling the packet, an address resolution protocol may be broadcast from the entry termination device to the entry end switch, and thereafter to the exit end switch for finding the location of the exit end switch relative to the exit termination device. Within each switch is a traffic manager. The traffic manager may include a traffic controller which dispatches a series of read operations to memory coupled within a data flow path between the input and output ports of the switch. Thus, the memory may include control information placed therein during a configuration cycle. The memory may also temporarily store packets of data dispatched from the input port. The traffic manager reads the control information and the packets of data in a predefined sequence so as to compile a wrapped packet that can then be forwarded to the output port.

The memory comprises any media which can receive packets of data and thereafter transfer those packets. The memory may involve a buffer, comprising semiconductor memory, wherein the memory is coupled to a bus across which packets of data are forwarded. The memory is responsive to a control signal forwarded across a bus separate from the bus that transfers packets. Thus, the bus represents a routing path of the network. The traffic controller works in conjunction with memory, similar to a compiler, for reading packets of data from memory and wrapping that data with control information stored in another section of the memory. In addition to it managing traffic flow through the switch, the traffic controller also functions to control the allocation of various resources such as ports, bypass paths and buffers within the switch.

In addition to the memory (or buffer) a conductor may be coupled in parallel across the buffer. A configuration register associated with the traffic manager may be programmed to select routing of the data flow path across either the buffer or the conductor depending on the availability of the output port.

The method for wrapping a packet of data may therefore include temporarily storing a packet of data in memory located within the flow path of the packet. A set of read operations can be dispatched to memory for reading various addresses (destination and origination addresses), control information, and the temporarily stored packets, in order to form at least a portion of a wrapped data packet.

BRIEF DESCRIPTION OF THE DRAWINGS

Other objects and advantages of the invention will become apparent upon reading the following detailed description and upon reference to the accompanying drawings in which.

Figure 1:
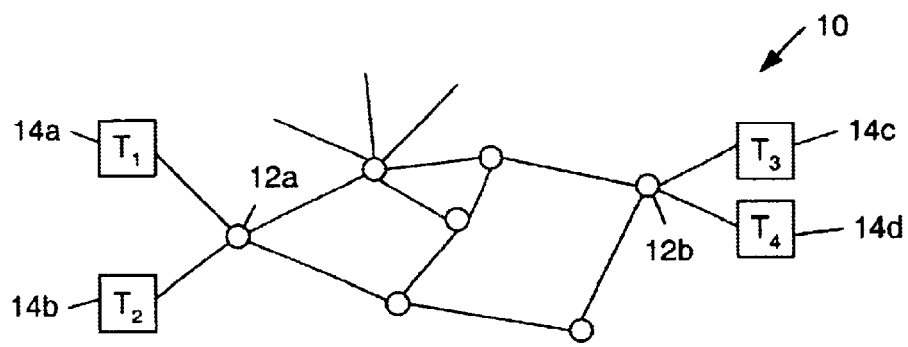
FIG. 1 is a diagram of a set of nodes within a network configured between termination devices.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a communication network 10. Network 10 includes an interconnection of subnets linked by nodes 12. Accordingly, network 10 can be thought of as one or more intranets interconnected with one another, or interconnected via an internet.

Each node 12 can be thought of as embodying a subnet or a plurality of interconnected subnets. Select nodes 12a and 12b can be used to receive input or output data forwarded via termination devices 14. Termination device 14 includes any device which can forward input data or receive output data, popular forms of such input devices include a telephone or computer.

Figure 2:
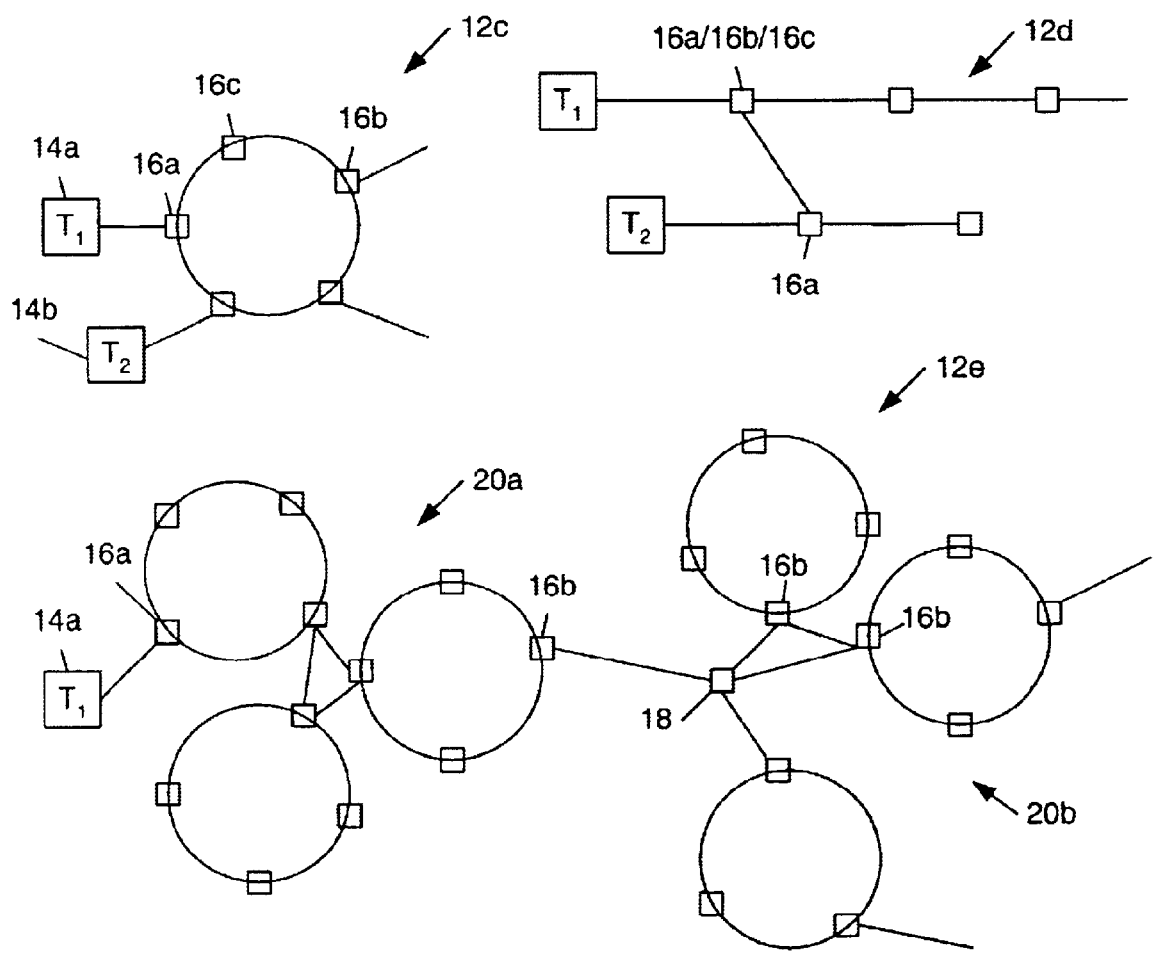
FIG. 2 are diagrams of a node configured according to a loop, multi-loops, multiple interconnected multi-loops or point-to-point topography, each configuration having a set of switches or modules interconnected with one another between loops or along a loop or backbone.

FIG. 2 illustrates exemplary forms of node 12 and, more specifically, modules or switches 16. Node 12c illustrates one example of a node comprising switches interconnected about a ring topography, oftentimes referred to as a "loop". Coupled to termination device 14a is an end switch 16a, and coupled to end switch 16a via the loop are intermediate switches (or pass-through switches) 16b and 16c, respectively. Node 12d illustrates a segment topography. As such, it is recognized that a node or subnet can include either a backbone or ring topography, depending on the desired application. The various nodes 12 can be classified as single nodes or multi-nodes, each of which can be an end node, a pass-through node or an intermediate node depending on where within the network they are arranged. The various switches within each node can also be classified as an end switch, a pass-through switch or an intermediate switch based on their position within the network and/or within a node of the network. Further illustrated by node 12d is the interrelationship between an end switch 16a, or an intermediate/pass-through switch 16b/16c. More specifically, an end switch can be configured solely as an end switch, or as a combination of an end switch and pass-through switch, or as an end switch, pass-through switch and intermediate switch, or any combination thereof. Thus, the switch modules can be generic with specificity given during configuration based only on their position within the overall network. The modules are considered generic mostly in hardware, with software modifications used to effectuate their difference in placement. For example, an end switch may appear in hardware similar to an intermediate switch, possibly with the only difference being the function of the traffic controller as programmed within the configuration registers. It is understood that an end switch or intermediate switch may access physical media between termination devices or subnets, respectively.

Node 12e illustrates two multi-loop combinations of switches, the multi-loops are indicated as reference numerals 20a and 20b. The various loops of each multi-loop 20 is shown interconnected by an intermediate switch 16b, and the multi-loops 20a and 20b are interconnected by intermediate switches 16b, as shown. It may be that one or more intermediate switches of a node are configured off the loop, as shown by reference numeral 18. Accordingly, it is to be noted that switches 16 can have almost any number of input and output ports, and can be configured either to wrap an incoming packet, strip an outgoing packet, and/or pass-through the packet with or without buffering, depending on where the switch is in relation to the network topography or termination devices.

Figure 3:
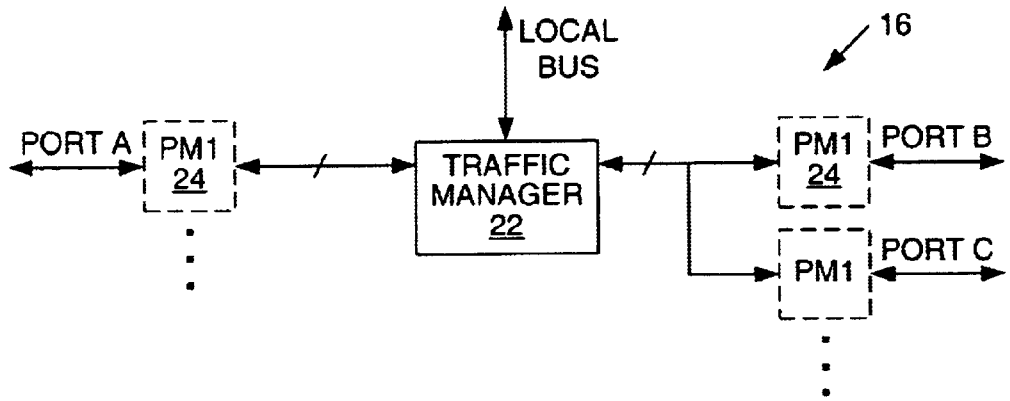
FIG. 3 is a block diagram of a switch employed as either an intermediate, pass-through or end switch, each of which includes a traffic manager.

Each switch can be used to forward or route incoming packets received on an input port to one or more output ports. The incoming packets can be received over any type of media, including wired media or wireless media. FIG. 3 illustrates an exemplary module configured as switch 16. Traffic manager 22 serves many functions, one of which is to optimally route packets of data between input and output ports. The number of input and output ports can vary and the interconnection between certain input ports and certain output ports can also vary depending on the configuration of switch 16. Switch 16 may be called upon to interface with a different physical media than the loop protocol by using a Physical Media Interface ("PMI") 24. PMI 24 performs many functions, one of which includes the MAC function of moving data over physical hardware conductors based on the physical address on each network interface card within the computer termination device, and another of which is to synchronize the packets of data being sent or received. If switch 16 is not used to convert between OSI layers, then the wrapped packet (e.g., a physical media packet wrapped with higher domain protocols) may be directly sent through switch 16 to the appropriate port. PMI 24 is shown in dashed line to indicate their presence only when conversion is needed to or from the dissimilar physical layer protocols. For example, PMI 24 may be used to interface between a wire (i.e., copper) conductor physical media and fiber optics. PMI 24 may also be used to detect a valid packet, serialize/de-serialize the packet, and perform other basic functions associated with traditional MACs.

Figure 4:
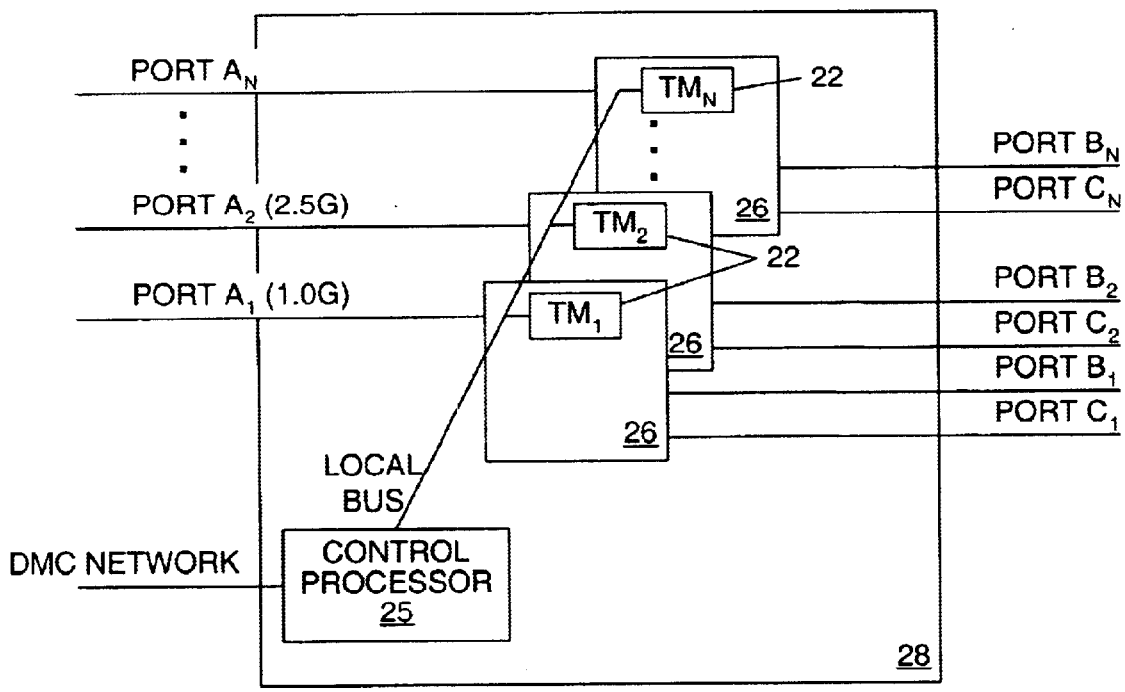
FIG. 4 is a block diagram of the a modular implementation of several traffic managers grouped together as modular building blocks according to a particular application and linked by a local bus extending from a control processor.

FIG. 4 indicates the modularity by which multiple traffic managers 22 can be interconnected to a control processor 24 via a local bus. The functions of control processor 24 and its associated local bus are completely separate from and outside the data communication path of the forwarded packets. Thus, packets are received by input ports, shown as port A and are disbursed to output ports, shown as port B or port C. Importantly, the incoming packets on port A, can be forwarded at a dissimilar speed and possibly within a different protocol from that of packets forwarded across port $A_2$. As shown, packet speeds for port $A_1$ may be 1.0 Gb/s, whereas speeds across port $A_2$ may be 2.5 Gb/s, for example. The incoming packets on port $A_1$ can be forwarded to port $B_1$ or port $C_1$, while incoming packets on port $A_2$ can be forwarded to port $B_2$ or port $C_2$, etc. Alternatively, packets from port A, port B, or port C can be forwarded back to itself. Traffic managers 22 can each be formed on a printed circuit board 26 separate from each other. Thus, each traffic manager 22 may be formed on a single integrated circuit or a set of integrated circuits interconnected upon a respective printed circuit board. The various printed circuit boards may each be connected to a motherboard 28, if desired. Formed on motherboard 28 may be control processor 24. In one embodiment, motherboard 28 can be a back panel while control processor 24 can be one of the boards mounted onto the motherboard. In yet another embodiment, control processor 24 can be located in a chassis separate from the motherboard or at a location distal from the chassis into which the motherboard is configured. One or more printed conductors, cables or wireless medium may extend from control processor 24 to each of the various integrated circuits which form traffic managers 22. Those printed conductors are formed according to well-known board manufacturing techniques. Depending on the desired bandwidth, the number of conductors associated with the local bus can vary. According to one example, the local bus can follow the PCI standard.

It is desired that each traffic manager be configured during assembly of the network. That is, each traffic manager can include programmable logic and, more importantly, non-volatile memory. When programmed, the traffic manager will maintain its programmed status unless it is reconfigured. The traffic managers are therefore configurable using known program techniques usable with, for example, firmware, such techniques include programmable read only memory ("PROM"), programmable registers from non-volatile memory, fuses, anti-fuses, etc.

The traffic manager configuration will be maintained unless the network is reconfigured. Reconfiguration can take place if, for example, traffic congestion is discovered in a select region of the network. Alternatively, reconfiguration can occur when the network is changed or expanded. Still further, reconfiguration might occur when a section (e.g., subnet) of the network is taken down or deactivated for various reasons. In this instance, one or more traffic managers can be reconfigured in the field or, alternatively, those traffic managers can be selectively reconfigured using a broadcast technique. In particular, a transceiver may be used to transmit reconfiguration signals to control processor 24, whereby processor 24 will dispatch the appropriate reconfiguration signals to one or more traffic managers connected to the local bus. In this manner, multiple traffic managers can be scaled to meet a particular application of a switch having input and output ports carrying packets transmitted at dissimilar speeds and/or dissimilar protocols. An intermediate switch can be linked between subnets, whereby certain subnets involve packets transmitted at different speeds from those of other subnets, and by interconnecting multiple traffic managers within an overall motherboard 28 configuration, an intermediate switch formed by multiple traffic managers can accommodate this, as well as other applications.

Figure 5:
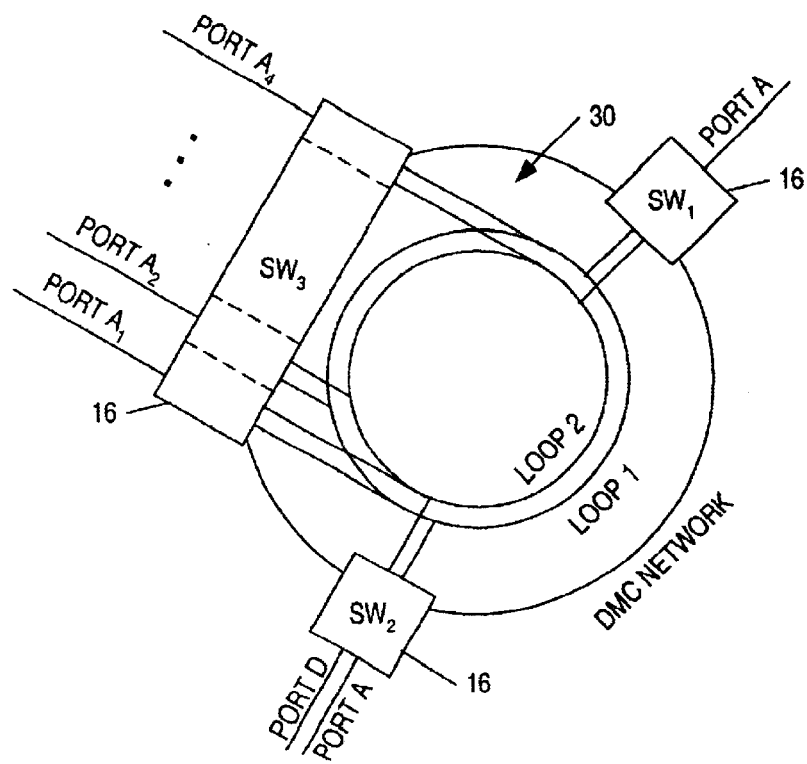
FIG. 5 is a block diagram of several switches coupled to a loop, wherein one switch is configured with other switches to provide added connection versatility between external ports of the switch or grouping of switches.

FIG. 5 illustrates one example of switch modularity. Illustrated is a loop 30 having respective ports of switches 16 connected to that loop. Loop 30 may consist of one or more optical pathways, or metal conductors. Each switch 16 may have one or more input ports as well as one or more output ports. Switch 1 ($SW_1$) illustrates a Y-port configuration, whereas switch 2 ($SW_2$) illustrates a star-port configuration. Switch 3 ($SW_3$) is shown scaled with multiple traffic managers, each having at least two ports, one being an input port and the other being an output port. Coupled between switches may be a diagnostic-monitoring-control (DMC) network. DMC network includes any wired or wireless communication network that can selectively forward diagnostic, monitoring, and/or control information to a traffic manager at the various locations of the switches. The DMC network thereby allows modifications to the traffic manager function, wherein the DMC network can extend to all or a select few of traffic managers throughout the network. DMC network communication is either separate from the structured network flow path, or can use in-band signaling.

Figure 6:
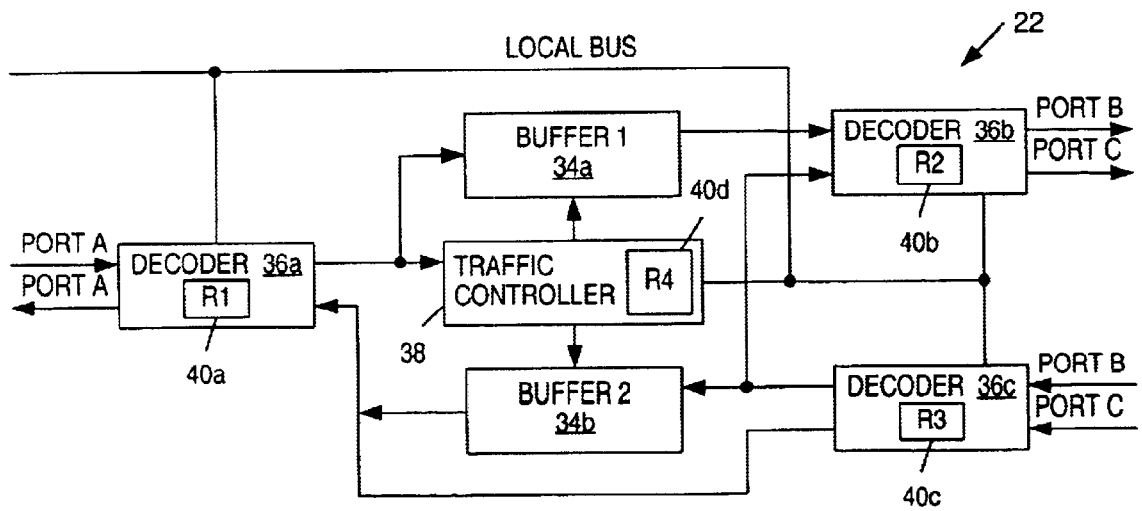
FIG. 6 is a block diagram of a traffic manager comprising a traffic controller linked to buffers and decoders placed within the data transmission path of the network.

FIG. 6 illustrates traffic manager 22, shown in further detail. Traffic manager 22 functions to direct incoming data to an appropriate output port. It determines the output port for an incoming data packet based on a simple algorithm. The traffic manager is aware of its position relative to the network and its neighboring traffic managers or nodes. Based on this knowledge, the traffic manager determines the appropriate output port in accordance with the predetermined algorithm. The traffic manager 22 also interfaces between ports of different media, speed and direction. After the output port assignment is made, the traffic manager can: (i) store the data in a local buffer if the incoming data is slower than the speed of the directed-to output port, until there is sufficient data to sustain the speed of the output port, (ii) forward the data without an intervening storage if the output port is free or if the incoming data is at the same speed as the output port, or (iii) transfer the data through a FIFO type storage device when the incoming data is coming at a faster rate than the speed of the output port. The traffic manager 22 manages resource allocation, such as allocation of various output ports and buffers, and the algorithms make decisions regarding allocation to reduce the latency through the traffic manager. A critical flow path for achieving extremely low latency across the switch is to forward incoming data from a port to the output of the same port. To accomplish this, input processing logic of the traffic manager recognizes this case and informs the logic within a couple of cycles to start the data packet. To speed this process, the wrapped header has the necessary information at the very beginning of the packet. Control logic enables the flow through path if the output port is free within a couple of cycles and informs the output logic. Input logic pipelines the data packet and strips some of the header. Output logic creates the stripped header and starts sending the packet out. It then appends the incoming data and continues the transmission of the packet. In a pipeline configuration involving multiple cycles, an example can be used to indicate how the traffic manager minimizes latency when undergoing a flow through condition. The sequence of transfers or cycles received begin with a start of packet (cycle 1), followed by a first header (cycle 2), a second header (cycle 3), data 1 (cycle 4), data 2 (cycle 5), data 3 (cycle 6), data 4 (cycle 7), etc., to complete seven exemplary cycles. During the third cycle (e.g., the first cycle is when a start of packet arrives at the input logic), incoming logic signals the control logic that there is a flow through packet. During the sixth cycle, the control logic notifies the outgoing logic that a flow through packet is on its way and the outgoing logic sets up the start of packet (start of packet information remains fixed from packet to packet) and receives header data from the incoming logic. The seventh cycle indicates incoming data being passed onto the output port through the output logic.

Traffic controller 22, shown in FIG. 6, includes one or more buffers, as well as one or more decoders. In the example shown, the buffer is distributed as two buffers 34$a$ and 34$b$, and the decoder is distributed as three decoders 36$a$, 36$b$, and 36$c$. Distribution of the buffers and decoders depends in part on the configuration of the ports. In the example shown in FIG. 6, a three-port configuration is shown. However, more than three ports and possibly only two ports can be used, wherein the number of decoders and buffers would correspondingly change.

Each port is shown as a bi-directional port and thereby accommodates full-duplex dialogs. The physical media of port A may be different from that of port B or port C, especially if switch 22 is configured as an end switch or an intermediate switch. For example, decoder 36$a$ serves to decode addresses of an incoming packet across port A to ensure that switch 22 is to receive the packet. Traffic controller 38 can be used to decide whether that packet should be forwarded to output port B or port C via decoder 36$b$. In many instances, the packet can be forwarded directly from port A to port B (or port C), or is forwarded through buffer 34$a$. Similar to port A, port B and port C incoming packets can be forwarded to port A, port B, or port C via decoder 36$c$. Traffic controller 38 includes control signals and address lines extending to each of the buffers and decoders for effectuating optimal routing based on the availability of the destination ports. Coupled in parallel across buffer 34$b$ is a conductor over which packets can be sent instead of sending those packets through buffer 34$b$. Thus, incoming packets on port B or port C can be forwarded directly to port A, to port A through buffer 34$b$, or directly to port B (or port C), as shown in the example of FIG. 6. A bypass conductor could also be shown coupled in parallel across buffer 34$a$; however, for sake of brevity and clarity in the drawing, only one bypass conductor is shown. FIG. 6 illustrates a three-port (or Y) configuration. However, a different port configuration is contemplated with additional buffers, decoders, bypass conductors, etc., to effectuate any switch configuration and numerous ports of that switch in order to directly or indirectly forward packets from any given input port to any desired output port.

Within decoders 36 and traffic controller 38 are configuration registers. The configuration registers may be configured from an In-System Programming ("ISP") tool used for configuring a Programmable Logic Device ("PLD") or a Programmable Gate Array ("PGA"). The configuration registers and therefore the traffic controllers and buffers can be thought of as a PLD or a PGA. Alternatively, the configuration registers can be programmed from non-volatile memory possibly associated with switch 22, or from the control processor via the local bus. The configuration registers 40 receive configuration information, preferably during initiation of power to switch 22. Alternatively, registers 40$b$ may be formed as an SRAM. Still further, registers 40 may include a PROM or ROM permanently programmed by the network installer. Contained within each register are bits used to enable certain ports in order to fix the forwarding of packets from one port to another, predefined port. Alternatively, each register may be configured to select various ports and paths based on dynamic traffic conditions.

Within register 40$a$ bits may be programmed to enable transfer of all packets from port A to port B, for example. Other bits programmed within the various registers include an identification number attributed to that particular switch. Each switch within the network has a corresponding unique identification number. The identification number signifies the relative location of the node with respect to other nodes in the structured network hierarchy. The identification numbers of all switches within the network contain bits bifurcated into fields and, as described herein below, each field corresponds to a particular level. A decoder which receives incoming packets can be configured by its corresponding register to only decode a field of bits to which that particular switch has been attributed. In other words, if switch 22 belongs to level 3, then decoder 36$a$ can only decode the destination address of the incoming packet sent across port A within field 3 of the multi-field address. This ensures a fast decode operation and significantly enhances the throughput of data. If the decode yields a comparison, then decoder 36$a$ will forward the packet to the appropriate decoder 36$b$ or 36$c$ depending on which port is configured as the output port established within register 40$a$, 40$b$, 40$c$, and 40$d$. Alternatively, a decoder may be configured to decode all fields above it in hierarchical level, or one field above it, to determine if the packet belongs to the current level. Further details regarding differing functions, configurations, and operations of switch 22 will be provided when discussing whether switch 22 operates as an end switch (entry end switch or exit end switch), intermediate switch, or pass-through switch.

Referring to FIGS. 5 and 6 in combination, switch 1 (SW$_1$) can be configured as a pass-through switch, whereby ports B and C are coupled to corresponding loops, such that incoming data on one loop can be sent to input port B and back out to output port B on the same loop, or output port C on another loop. Thus, a pass-through switch may include only two ports, where the decoder adjacent the incoming packet will make the determination on forwarding that packet to the output port. An intermediate switch, configured as switch 1, switch 2, or switch 3 includes corresponding decoders of each input port for determining whether the switch is being targeted and which output port is to receive the forwarded packets, and further whether that packet will be sent directly or through a buffer based on configuration information within the incoming port decoder, or the availability of resources.

Figure 7:
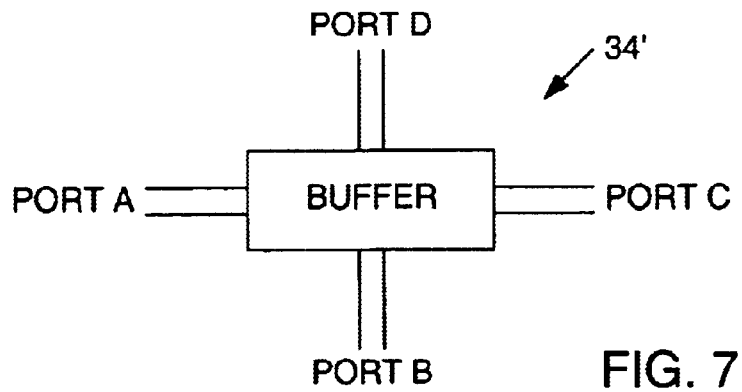
FIG. 7 is a block diagram of the various buffers of FIG. 6 coupled in a shared arrangement between various external ports of the traffic manager, according to one embodiment.
Figure 8:
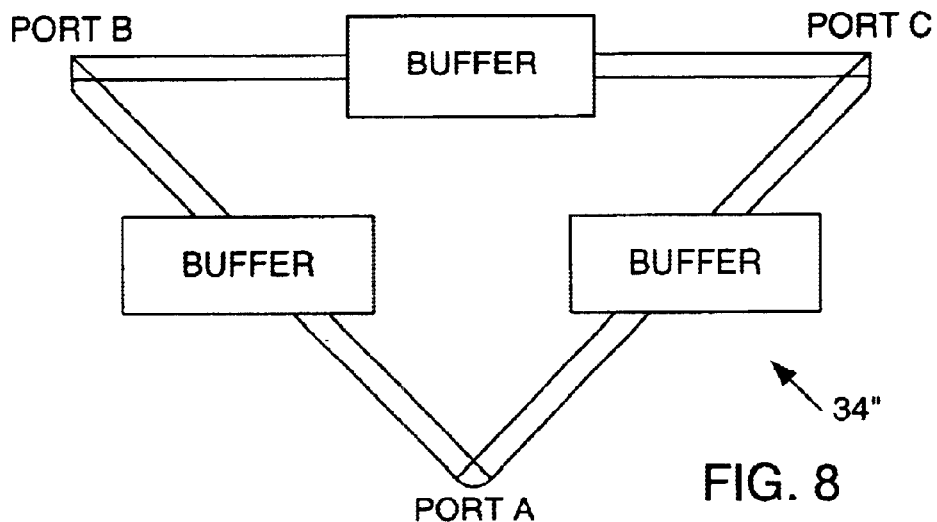
FIG. 8 is a block diagram of the various buffers of FIG. 6 distributed as dedicated buffers within each data transmission path between respective external ports of the traffic manager, according to another embodiment.

FIGS. 7 and 8 illustrate buffer 34 of a traffic manager being either a centralized buffer 34' or a distributed buffer 34". A centralized buffer 34' is used to receive and disburse packets of information from any particular input buffer to any particular output buffer. Accordingly, a buffer can be considered as any contiguous memory space, such as that found in semiconductor memory. A popular form of semiconductor memory includes single or multi-port RAM or DRAM (e.g., ZBT RAM or SDRAM). Buffer 34' may include dedicated memory portions across which packets from one port to another port are stored. Distributed buffer 34" is one having buffers dedicated to storing packets of information sent between port pairs. Regardless of the configuration, it is appreciated that data flow packets may be temporarily stored in main memory—either within a portion of a centralized memory or to a dedicated memory embodied upon one or more integrated circuits.

Figure 9:
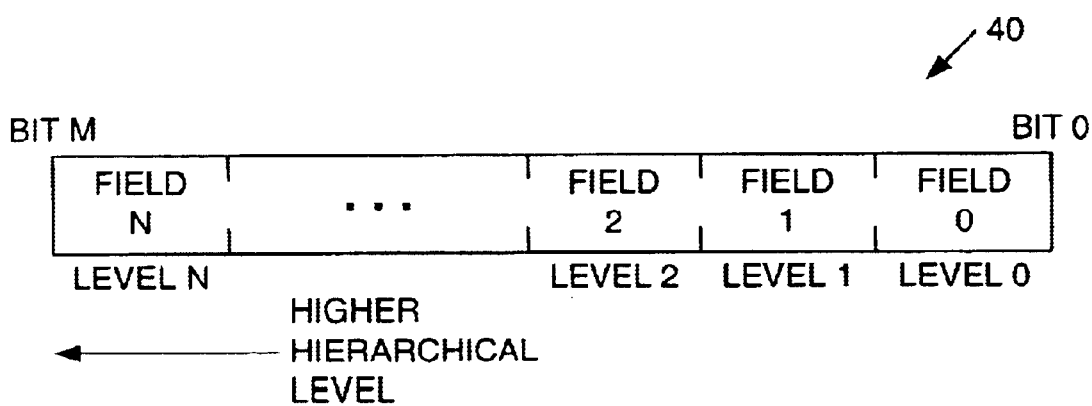
FIG. 9 is a switch identification number and/or switch address packet forwarded through a structured hierarchical network to enable fast decode of bit groupings (or fields) on a field-by-field basis according to the hierarchical, relative placement of switches within levels of the network.

FIG. 9 illustrates the format of bits representing a switch identification number 40. The same format is used as a destination address of a wrapped packet forwarded through the structured, hierarchical network hereof. Each switch within the network contains a unique identification number programmed within the configuration registers the switch's decoder and/or traffic controller. All switches associated with a particular level have a unique bit or set of bits programmed within only one grouping of bits (field). In the format shown, field N may include X number of bits which can therefore accommodate $2^X$ number of switches within level N of the structured network. Similarly, level N−1 may have Y bits and there can be $2^X$ level N−1 groups and each of these groups in level N−1 can have $2^Y$ number of switches. Given that field N corresponds with the highest hierarchical level, any routing beginning at that level entails decoding field N address of the incoming data with field N identification numbers before decoding the next level (field N−1).

Figure 10:
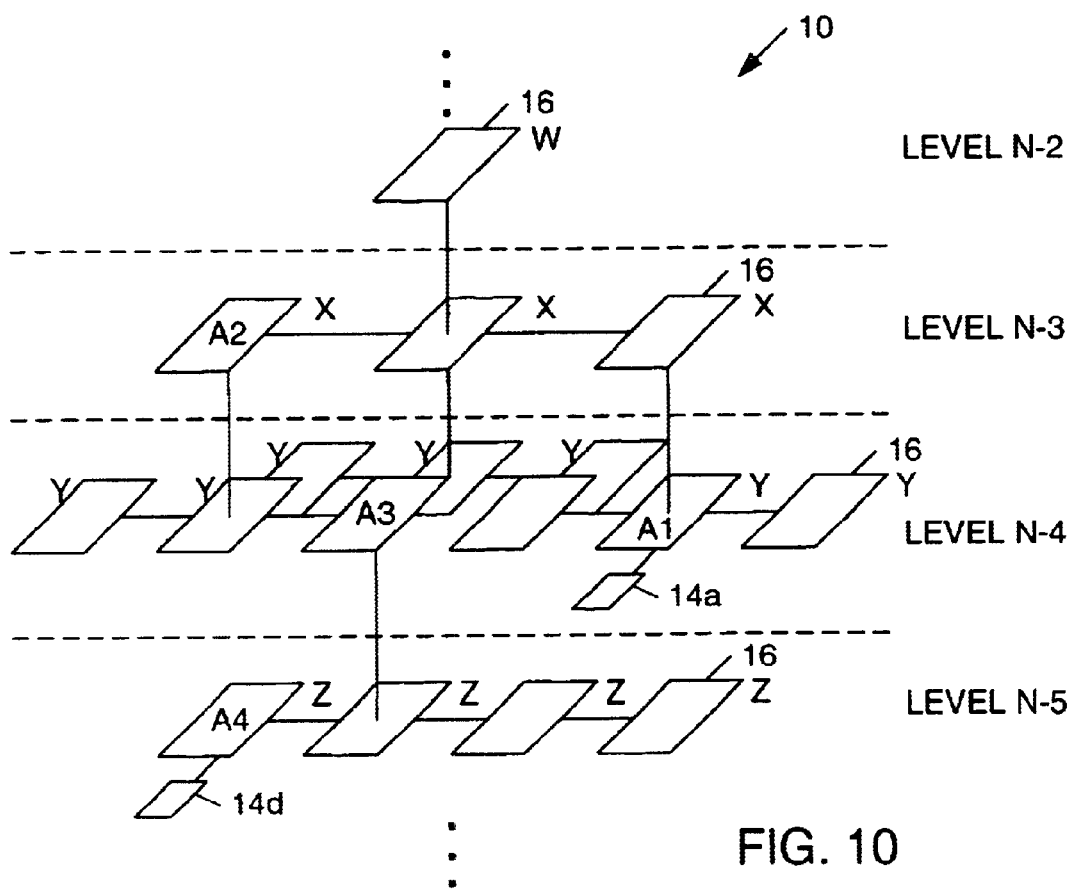
FIG. 10 is a logical diagram of nodes and associated switches arranged within levels, each level indicating a field of bits unique to switches within that level.

Referring to FIGS. 9 and 10 in combination, one example of a distributed routing mechanism using structured hierarchical decode mechanism is provided. The network 10 indicates three levels of possibly numerous levels. Switches 16 are each configured with a unique identification number within a field of bits applicable to that switch's level. In particular, the identification number is different within only one field attributed to switches X, and the identification number is different with another field attributed to switches Y. All other fields are don't care fields, or are irrelevant for comparing within that level. In the example shown in FIGS. 9 and 10, communication from a termination device 14a to 14d is forwarded to a series of compare operations. First, the address of a packet sent from termination device 14a, at level N−4, is compared with an identification number and, more specifically, a field of bits in level N−3 and higher. If the comparison does not yield a match, then it is determined that the packet must be forwarded from switch A1 in level N−4 to the next higher level. When a compare of fields N−2 and higher yields a match, the match is then checked against all nodes at that level and forwarded to the appropriate switch identification number (e.g., switch A2) that yielded a match in level N−3. It is known that termination device 14a is coupled to switch A-1 and, therefore, decode need not take place at level N−4. Secondly, another decode must occur at the next higher level (level N−2) to determine if the address forwarded from termination device 14a is to be routed to a switch in level N−2. If the comparison does not yield a match, then it is known that routing need not occur to the next highest level. The routing algorithm performs a comparison of the next lower level. Knowing the highest level of routing is currently at switches X within level N−3, the next comparison of the packet address is performed on switches in level N−4. If a match results, then that match is identified as a particular switch (e.g., switch A3). The comparison or decode process continues onto the next lower level, level N−5, to determine if further routing is needed. If the address at the next lower level of fields compares with an identification numbers in the next lower level field (level N−5), then it is determined that the routing must continue to a particular switch A4 that yields the comparison. The term "routing" is used in the sense of forwarding data packets across a network, from switch-to-switch, and should not be construed as involving a router. Instead, the routing herein merely refers to an incremental step in the distributed routing mechanism of the overall network and is used by a module to forward packets among hierarchical levels based on a decode comparison.

Figure 11:
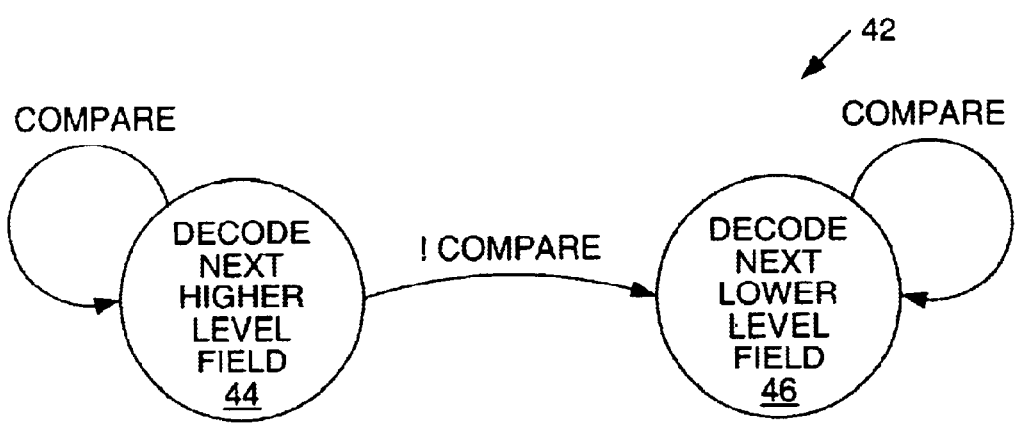
FIG. 11 is a state diagram of a fast decoding algorithm used to identify a routing path through the network of hierarchically placed switches.

As shown in FIGS. 9 and 10, and further illustrated in FIG. 11, the forwarding or incremental routing algorithm operates solely upon the destination packet address and identification numbers stored in registers of each switch. Registers within the input/output port decoders and traffic controllers are called upon by the decoders to perform a comparison with the incoming addresses without need for performing a look-up operation. Importantly, decode need only be performed on one or more number of fields within a plurality of fields—that field corresponding with where the prior comparison occurred within the overall hierarchical structure. Knowledge of the termination device whereabouts relative to the entry and exit end switches is a prerequisite to the present fast decoding algorithm. The mechanism for determining termination devices relative to end switches will be discussed herein below when performing a broadcast operation of the IP addresses across the structured network to all the various termination devices coupled to that network.

FIG. 11 illustrates a fast decoding state diagram 42 of distributed routing mechanism. Depending on which level a termination device is connected, decoding occurs at all higher levels, beginning with the next higher level field of bits. An entry end switch can mark a bit in the control word that signifies which level the switch is in, and then other switches in that level can compare only the field attributed to that level. The intermediate switches can perform the same function when forwarding the packet to the next level—either a higher or lower level that is setting a bit or bits in a control word signifying a match of levels. In the example shown in FIG. 10, decoding occurs in level N−3 for an origination termination device 14a coupled to a switch in level N−4. State 44 is continued for however many times it takes to yield a non-compare (!COMPARE). Once a non-compare occurs, then it is known that routing must now proceed, or possibly stop, at the level just below the level that yielded a non-compare. In the example of FIG. 10, comparison stopped when level N−3 yielded a non-compare—indicating that all higher levels greater than level N−3 will not receive the forwarded packet. Beneficially, all higher levels and derivatives from those higher levels which are outside of switch A2 shown in FIG. 10, need not undergo a comparison function. Comparisons at each level can be comparisons at all higher levels. Once a higher level compare is true, then the lower level comparisons are performed. Entry end switches or nodes can mark a bit in a control word which signifies the level and the remaining switches or nodes in that level may compare only that level of bits. Intermediate nodes or switches can do the same when forwarding the packet to the next level.

Once the highest level is identified for forwarding the packet, decode now continues down the hierarchical levels in succession, as shown by state 46. Comparisons for those levels are performed until a lower level switch identification number favorably concurs with the destination address. That switch is identified as an exit end switch that is selectably coupled to the target or destination termination device 14d, shown in FIG. 10.

The successive decode of bits within only a certain field, and progressing field-by-field across the incoming address and identification numbers minimizes the number of comparisons needed and the number of switch identification numbers being compared against. This relatively fast decode operation performs distributed routing function within the structured, hierarchical network, with the benefit of performing incremental routing by decode operations only on the field of interest and ignoring all other fields at any given point. The concept of being aware of all switch whereabouts within the network is of primary importance when forwarding the packets. This awareness in the structured network is beneficial not only in a hierarchical network but also in single level of hierarchy such as local loops. For instance, based on the identification number indicating where the switch is located, and the destination address, the packet can be sent around the local loop among the interconnected switches, either right of left.

Figure 12:
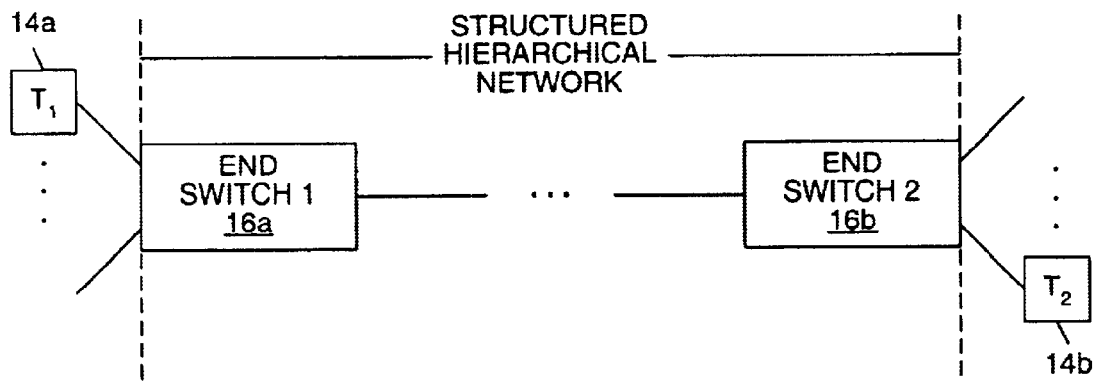
FIG. 12 is a block diagram of end switches placed on opposing ends (i.e., periphery) of the structured, hierarchical network, each end switch is shown linked to at least one termination device.
Figure 13:
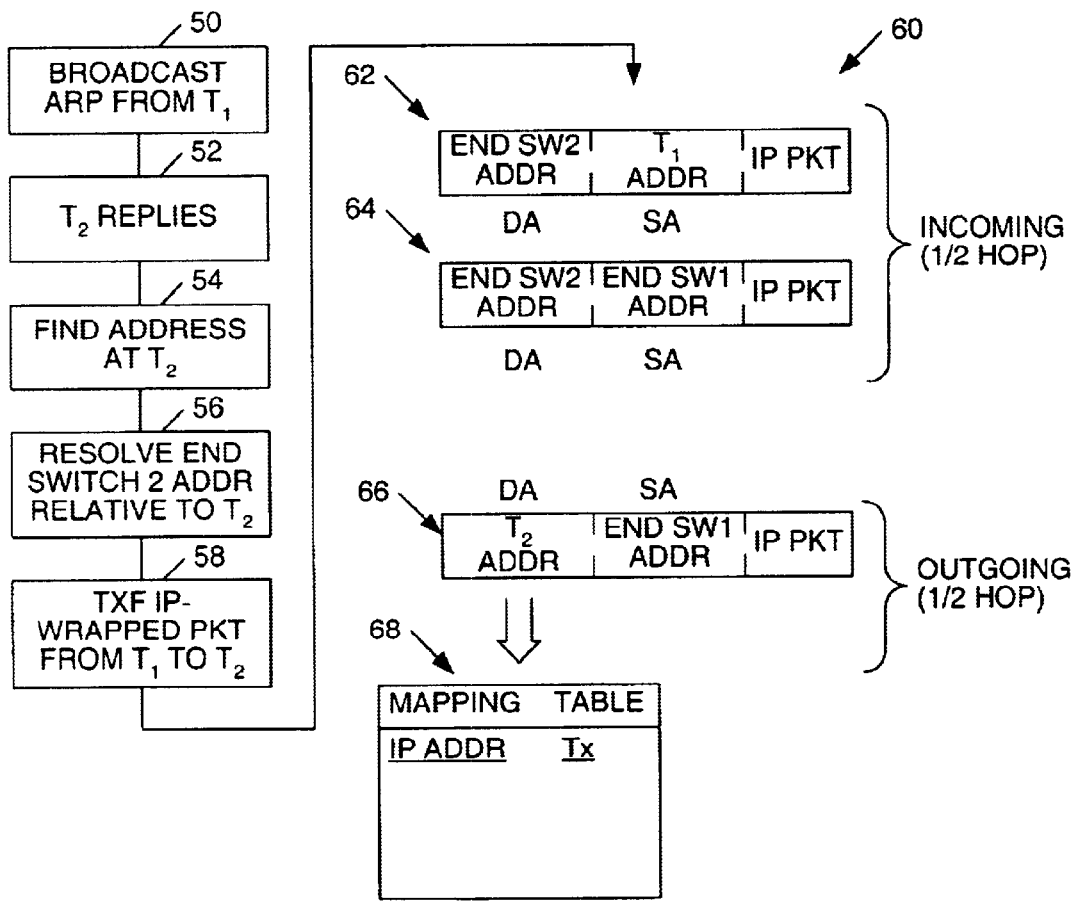
FIG. 13 is a diagram illustrating resolution of an end switch address relative to a targeted termination device, and the routing of data through the entire structured network without involving a hop or look-up operation, except for a relatively small mapping to possibly N number of targeted termination devices.

FIGS. 12 and 13, in combination, show path routing outside of the structured, hierarchical network. That is, while structured positioning and fast decoding performs distributed routing within the network, identification of a routing path to and from termination devices must be established. Coupled to termination devices 14a and 14b are end switches 16a and 16b, shown in FIG. 12. If device 14a is the originator of a packet, then end switch 16a can be considered an entry end switch. If the incoming packet includes a destination address to termination device 14b, then device 14b is considered the targeted or destination termination device, and end switch 16b is considered an exit end switch. From this example, FIG. 13 illustrates firstly, a mechanism for identifying the relationship between termination devices and end switches (particularly when there are multiple termination devices per end switch) and, secondly, how the incoming packet is routed from the originating termination device to the destination termination device 14a and 14b, respectively.

Referring to FIG. 13 in more detail, an Address Resolution Protocol ("ARP") may be broadcast from termination device 14a. The destination address of the broadcast ARP is to each and every node within the network, and continues on until all nodes have received the resolution protocol, as shown by block 50. Contained within the resolution protocol may be an IP address of destination termination device 14b. If so, then device 14b replies, as shown in block 52. That reply represents an ARP answer forwarded back across the network and eventually to the originating termination device 14a. Based on the broadcast of addresses and ensuing replies, the positions of termination devices relative to end switches can be determined based on the IP address of those destination and origination devices. Accordingly, the address at destination device 14b is found based on its IP address being broadcast, as shown by block 54. That address and its configured location relative to end switch 16b will thereby resolve their connectivity relationship, as shown by block 56.

Blocks 50–56 illustrates a mechanism for determining the relative location of termination devices, nodes, and switches according to well-known address resolution protocols. Accordingly, the technique of broadcasting an address (e.g., Ethernet address) across the network to resolve locations hereof is backward compatible with existing legacy location mechanisms known to the skilled artisan. However, it is from the resolved locations that a packet can be quickly transferred between locations external to the present structured network (i.e., termination devices or a non-structured, conventional network).

Transfer of a wrapped packet from an originating termination device 14a to a destination termination device 14b is shown in block 58, and entails mechanism 60. Other protocols or domains outside of IP can be wrapped using the present technique, and therefore FIG. 13 is merely an example of one way in which a generic protocol (e.g., IP can be wrapped). Referring to the examples of both FIGS. 12 and 13, reference numeral 60 illustrates an incoming IP packet wrapped by end switch 16a and simply having a source address (SA) of origination termination device 14a and a destination address (DA) of exit end switch 16b. The wrapped packet is shown as reference numeral 62. More specifically, entry end switch 16a merely wraps an existing packet with a known identification address of an exit end switch, known in its relationship to a destination termination device by virtue of the address resolution protocol. Moreover, the destination termination device address is contained within the IP packet of wrapped packet 62.

Before sending the wrapped packet onto the structured network, entry end switch 16a converts only the source address from that of termination device 14a to that of the entry end switch 16a, if multiple termination devices are attached to the end switch, as shown by the wrapped packet 64. Knowing the source address as the entry end switch address proves beneficial when the destination termination device replies to the originating termination device, as will be discussed herein below. The destination address and the IP packet remain the same, as illustrated by comparison between wrapped packet 62 and wrapped packet 64.

Once the wrapped packet is received upon the exit end switch 16b, only the destination address changes from exit end switch 16b to destination termination device 14b especially if there are multiple termination devices attached to end switch 16b. The source address, however, remains the same as that which was changed when the packet is forwarded into the structured network. Given that the destination address is termination device 14b, exit end switch 16b performs the single, and only look-up, needed by the entirety of the structured network. As defined herein, look-up is a deterministic, static, 1-to-N mapping to a localized device from among many such devices.

Mapping proceeds from the destination address placed on the wrapped packet by the exit end switch 16b in order for the IP packet to be directed to the appropriate termination device by comparing the IP address within that packet with the appropriate IP identification number of a possible x number of termination devices, as shown by translation table 68. Mapping table 68 may be formed within memory of end switch 16b or, alternatively, a selection unit such as multiple multiplexers, or any other form of routing based on selection signals. Mapping is performed by comparing the destination address (IP address) within wrapped packet 66 with the IP identification number stored in an appropriate termination device $T_x$. When the comparison yields a match, the packet is forwarded to the appropriate termination device (e.g., termination device 14b as opposed to numerous other termination devices connection to end switch 16b).

Any reply to the initial forwarded address can be sent back across the structured network based on the format of wrapped packet 66. More specifically, the source address of the reply remains the address of termination device 14b, however, the destination address is the previous source address—i.e., the address of entry end switch 16a. In this manner, reply information is made similar to the initial forwarded information. Regardless of the initial request or a subsequent response, the packets of data are routed to the opposing end switch. In particular, information from termination device 14a is directed to exit end switch 16b, while reply information from termination device 14b is directed to entry end switch 16a. The source address is therefore said to change whenever a packet enters the network, however, the destination address remains the same. The same applies on a reply. Whenever a packet exits the network, only the destination address changes with the source address remaining the same. This ensures that when traversing the entire structured network between termination devices, only a single mapping or translation occurs when forwarding the packet outside the structured network to one of a plurality of termination devices. Intermediate switches and/or nodes of the network do not perform conversion of the destination or source addresses, nor do they perform any look-up.

The look-up arises from a relatively small table, known alternatively as a translation table. Importantly, the number of termination devices linked to the exit end switch on a request operation (or an entry end switch on a reply operation) is relatively small. It will be appreciated that the structured network can form a subnet within a larger, conventional network. In this manner, the hierarchical decoding and single mapping applies to data traversing the structured network, that data being packets which are forwarded across multiple subnets where one subnet may be dedicated to the structured network. Accordingly, the structured network can form the entire network of subnets (intranets) as well as the internet between one or more subnets or, alternatively, can form only a portion (one or more subnets) of a conventional network. Regardless of which portion of the entire inter- and intra-network is formed by the structured network, or whether the structured network comprises the entire network, only one look-up (defined as a mapping function) need occur as packets exit the structured network to beneficially improve overall packet throughput. Absence of traditional routing in the structured network greatly enhances the speed at which packets are forwarded to their appropriate destination.

Figure 14:
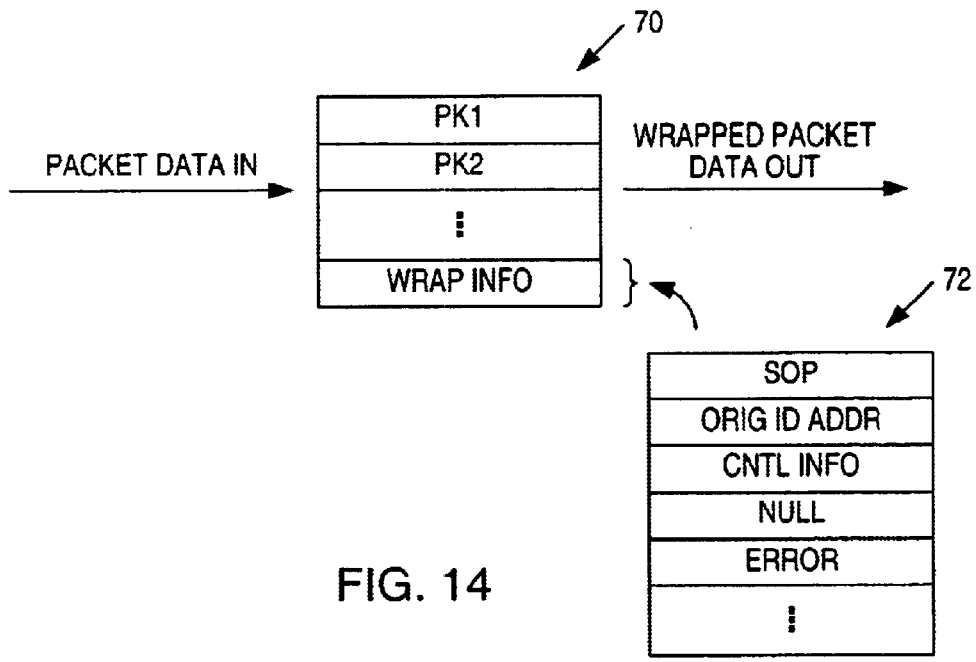
FIG. 14 is a diagram illustrating a buffer of the traffic manager within an end switch, wherein the buffer is placed within a data path and contains wrap information to be appended to data as it traverses the buffer.

FIG. 14 illustrates a memory area within a memory (or buffer) of an end switch. Memory area 70 may be bifurcated into regions, some of which receive certain packets placed in a defined order within those regions. That is, the first packet (PK1) is forwarded into and placed within a defined portion of buffer 70 before the second packet (PK2) is placed and stored. Buffer 70 therefore serves as a FIFO buffer, for example. The incoming packets are wrapped as they leave buffer 70 by attributing wrap information to a particular packet before forwarding the wrapped packet from the buffer. Wrap information is stored in another region of buffer 70 and can include but is not limited to the information shown in table 72. That information may comprise a grouping of bits indicating a start of packet (SOP). Another group of bits are used to indicate the originating identification number of the originating switch (ORIG ID ADDR). Another set of bits may be dedicated to general control information, such as the level of hierarchy, length of packet header (or footer), packet types, etc. Yet another group of bits are dedicated to forwarding a null pattern used possibly to indicate spacing between wrapped packets. Yet another set of bits may be used to indicate an error in the packet transmission. It is recognized that the wrap information 72 can include numerous other bits dedicated to achieving many dissimilar functions, only a small grouping of which is shown by the examples provided. The manner in which the wrap information is wrapped about a packet is further described in reference to FIG. 15. More specifically, description of FIG. 15 is applicable when referring to FIG. 15 in conjunction with FIG. 6.

Figure 15:
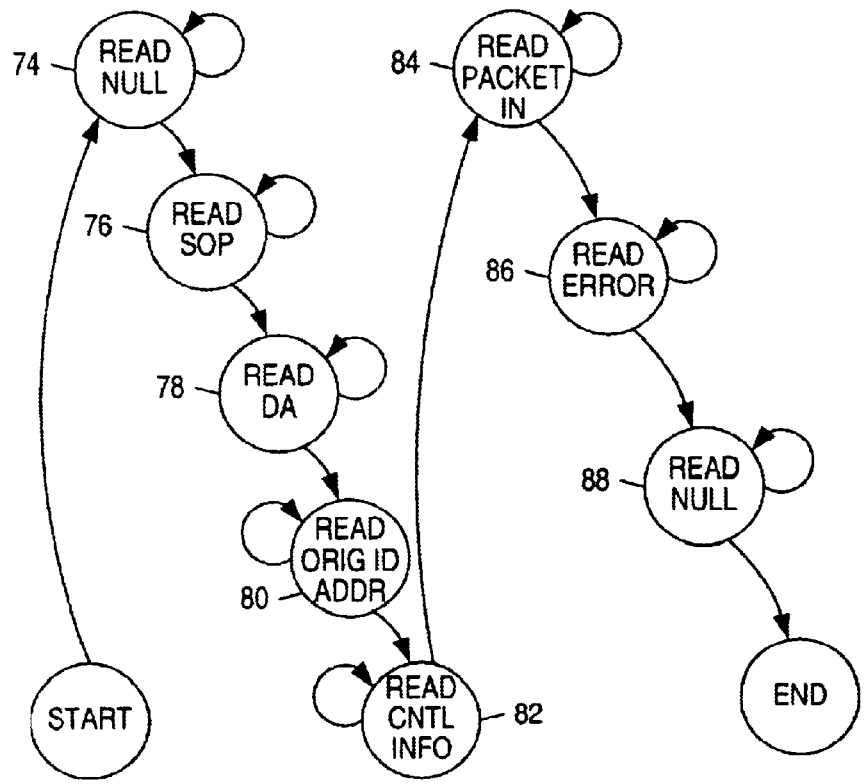
FIG. 15 is a state diagram of a sequence of reads issued to the buffer of FIG. 14 from the traffic controller for appending or wrapping the data as it traverses the buffer.

FIGS. 6 and 15 illustrate traffic controller 38 operating as a compiler which performs a series of read operations upon a buffer. Those read operations occur to fixed regions of that buffer so as to read bits from those regions in a particular sequence so that the resulting wrapped packet is serially fed from the buffer in a particular order. As such, the compiler part of the traffic controller can be thought of as containing a state machine of sequential logic which performs a first read of a null pattern 74 indicating the end of the prior wrapped data packet. The read null pattern is contained within the wrap information of the buffer, as well as other wrap information thereafter beginning with the start of packet at state 76. The destination address of the structured network protocol is thereafter read at state 78, and the originating identification address is read at state 80. Control information within the wrap information region of the buffer is then read at step 82, and so forth for the remaining read operations 84, 86, and 88 to complete the wrap of a packet from the buffer. Each read or fetch occurs to a specific location within memory to routinely drawn whatever information is present in that location. Thus, the wrap information is configured in specific regions of the memory so that they can be drawn from those regions in the order specified by the state machine of FIG. 15.

The switch which has a traffic controller performing the various read operations is considered an end switch and, more specifically, an entry end switch. The entry end switch wraps the incoming IP packet with various wrap information needed to transfer that IP packet across the structured network and, additionally, to a termination device outside of the structured network. Therefore, the structured network is backward compatible with all other existing networks, with the wrap information simply subsuming the pre-existing wrap information. The entry end switch adds the wrap information and exit end switch removes or strips the wrap information, as shown in FIG. 17.

Figure 17:
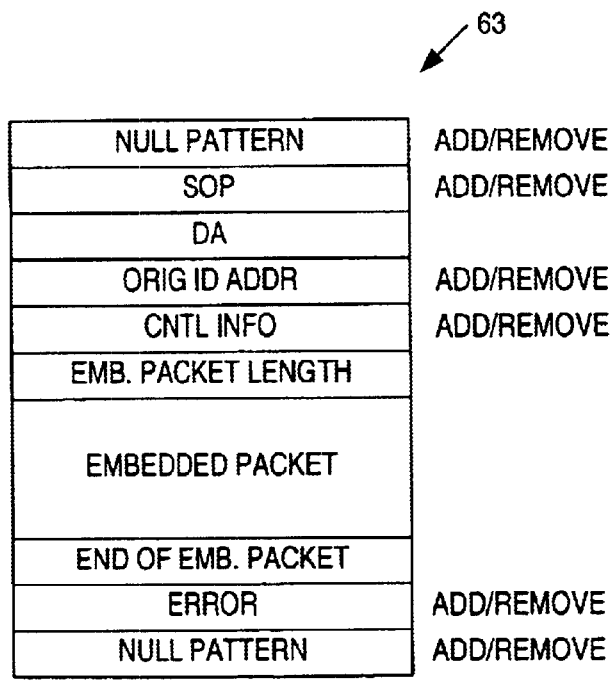
FIG. 17 is a block diagram of a packet wrapped in accordance with the sequence of read cycles shown in FIG. 15, and forwarded across the structured hierarchical network.

FIG. 17 further illustrates bits added to and removed from an embedded packet (e.g., Ethernet packet). The wrapped packet 90 shown in FIG. 17 is but one example of a packet format used by the structured network. There may be additional bits or field of bits added to the format, if desired. The entry end switch thereby adds the wrap information and the exit end switch removes the wrap information to yield only the embedded packet with starting and ending identifiers forwarded to a termination device or to other non-structured subnets outside of the present structured network.

Figure 16:
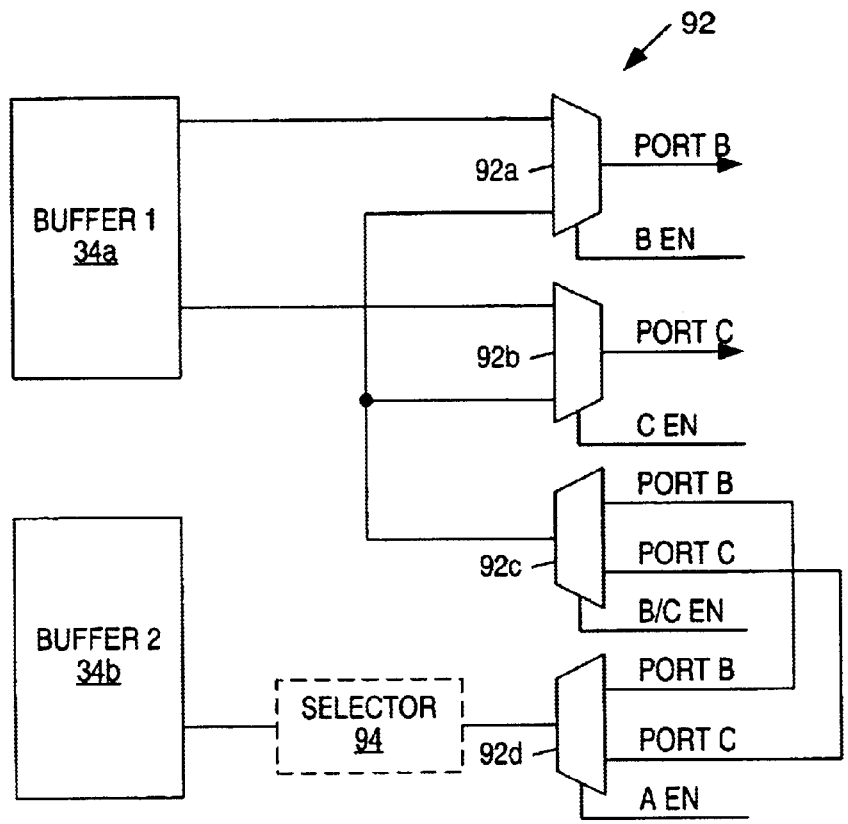
FIG. 16 is a block diagram of a selector and various multiplexers which form at least a portion of the decoders shown in FIG. 5, wherein the selector and multiplexers route data either directly between ports or between ports via buffers depending upon the availability of the targeted port.

FIG. 16 illustrates various multiplexers 92 explained in conjunction with FIG. 6. Multiplexers 92a and 92b can form a part of decoder 36b, while multiplexers 92c and 92d may form a part of decoder 36c. Various enable (EN) signals can be sent from the traffic controller which serves as an arbiter. B EN serves to signify when the output port B is available, whereas C EN is used to signify when output port C is available. Depending on whether select signal B EN or select signal C EN is asserted, packets from input port A, input port B, or input port C are forwarded to respective output ports B or C. In the example of FIG. 6, FIG. 16 provides a corollary, in that signals upon input ports B and C can be directed either to output ports B or C, as well as output port A, depending on the status of select signals B EN, C EN, and A EN. It is appreciated that the example shown in FIG. 16 is used only for sake of brevity and clarity, as well as for consistency with FIG. 6. There maybe various configurations possible as to how these ports can be interconnected. There may be numerous other ports beyond port A, B, and C used in practical applications and, therefore, FIGS. 6 and 16 are only for exemplary purposes only. The various enable signals may be fixed within corresponding registers during configuration, those registers include register 40, shown in FIG. 6. The enable signals can either be static or dynamically determined by traffic controller 38. A selector 94 can further be used to forward data through a buffer output port A or bypass the buffer and place packets across a bypass conductor coupled in parallel with that buffer. The various enable signals, in combination with the selector 94, are used to send data either directly between ports or between ports via buffers depending on the availability of the targeted port. The desirability of selecting between whether a packet can be sent directly to an output port or through a buffer is beneficial if the status of the output port is known. That will be dynamically determined based on resource availability and a resource allocation algorithm. The resource allocation algorithm will be determined by the control registers configured through the local bus by the control processor.

It will be appreciated to those skilled in the art having the benefit of this disclosure that the various embodiments herein are believed to be capable of performing fast and efficient transfers across a structured network which either replaces or forms at least a portion of a conventional communication network. Various modification and changes may be made as would be obvious to a person skilled in the art having the benefit of this disclosure. It is intended that the following claims be interpreted to embrace all such modifications and changes and, accordingly, the specification and drawings are to be regarded in an illustrative rather than a restrictive sense.

What is claimed is:

1. A routing network of more than three nodes and three branches, wherein only one switch within one node performs a single address translation as the data traverses the entire routing network and is sent to one of a plurality of termination devices.

2. The routing network as recited in claim 1, wherein the single translation comprises a selection device such as a programmable switch or router.

3. The routing network as recited in claim 1, wherein the single translation comprises a mapping table stored within a switch selectibly coupled to a termination device targeted by the data.

4. The routing network as recited in claim 1, wherein the single translation is used to select between multiple termination devices, only one of which is targeted by the data.

5. The routing network as recited in claim 1, wherein said one switch within said one node comprises a port which exits the routing network.

6. A communication network comprising:
   an entry end switch;
   an exit end switch selectibly coupled to a plurality of termination devices, one of which is an exit termination device;
   a plurality of intermediate switches coupled between the entry end switch and the exit end switch; and
   a packet compiled by the entry end switch to contain a destination address of the exit end switch, wherein the packet is forwarded through the plurality of intermediate switches with each intermediate switch having an identification number which points the packet to a successive one of the plurality of intermediate switches and finally to the exit end switch which performs the entirety of all translation needed by the communication network to route the packet from the exit end switch to the exit termination device.

7. The communication network as recited in claim 6, wherein the identification number of each of the intermediate switches point the packet absent a look-up operation by any of the intermediate switches.

8. The communication network as recited in claim 6, wherein the packet comprises an internet protocol (IP) target address of the exit termination device for routing the packet from the exit end switch to the exit termination device.

9. The communication network as recited in claim 6, wherein routing between the entry end switch and the intermediate switches, as well as between intermediate switches, is performed in lieu of a routing table.

10. The communication network as recited in claim 6, wherein data entering the entry end switch and exiting the exit end switch traverses a maximum of a single translation.

11. The communication network as recited in claim 6, wherein the exit termination device is a communication terminal comprising either a computer or telephone.

12. A method of routing data, comprising:
   providing a communication network comprising multiple interconnected intermediate switches terminated between an entry end switch and an exit end switch;
   providing an entry terminal selectibly coupled to the entry end switch;
   providing an exit terminal selectibly coupled to the exit end switch;
   compiling a packet comprising a destination address of the exit end switch and a source address of the entry termination device, and forwarding the packet from the entry termination device to the entry end switch;
   while maintaining the destination address, updating the source address to the address of the entry end switch while forwarding the packet from the entry end switch to the exit end switch, exclusive of look-up operations in the interim; and
   while maintaining the source address, updating the destination address to the address of the exit termination device while mapping the packet from the exit end switch to the exit termination device.

13. The method as recited in claim 12, further comprising resolving an addressing relationship between the exit termination device and the exit end switch.

14. The method as recited in claim 13, wherein said resolving comprises:
   before compiling the packet;
      broadcasting address resolution protocol from the entry termination device to the entry end switch, thereafter to the exit end switch, and further thereafter to the exit termination device;
      finding the location of an exit termination device; and
      associating the location of the exit termination device with an identification address of the exit end switch.

15. The method as recited in claim 14, wherein resolving comprises generating a mapping table within memory of the exit end switch to allow use of the mapping table for directing the packet from the exit end switch to the exit termination device.

16. The method as recited in claim 15, wherein generating the mapping table comprises tabulating the results of the associating step for a plurality of exit termination devices.

* * * * *